United States Patent

[11] 3,629,044

[72] Inventor Albert J. Sanger
 105 South Lake Ave., Blackwood, N.J. 08012
[21] Appl. No. 887,446
[22] Filed Dec. 22, 1969
[45] Patented Dec. 21, 1971

[54] VEHICLE WINDSHIELD CARRYING VEHICLE SERIAL NUMBER
10 Claims, 4 Drawing Figs.

[52] U.S. Cl. ................................................. 161/5,
 40/2.2, 161/125, 161/199, 161/204, 283/7, 283/8,
 296/84 R
[51] Int. Cl. ....................................................... B32b 17/10
[50] Field of Search ............................................. 161/199,
 204, 5, 6; 156/277; 296/84, 95; 264/132; 283/6, 7,
 8; 40/2.2; 117/1, 1.5

[56] References Cited
UNITED STATES PATENTS

| | | | |
|---|---|---|---|
| 2,780,015 | 2/1957 | Whitehead | 40/2.2 |
| 2,835,993 | 5/1958 | Whitehead | 40/2.2 |
| 3,221,428 | 12/1965 | Fischler et al. | 40/2.2 |
| 3,457,661 | 7/1969 | Peters | 40/2.2 |
| 1,247,061 | 11/1917 | Zimmerman | 283/7 |
| 1,996,288 | 4/1935 | Galt | 283/7 |
| 2,194,013 | 3/1940 | Dennison | 161/204 |
| 3,351,518 | 11/1967 | Ryan | 161/199 |
| 3,377,749 | 4/1968 | Shumaker | 51/8 |
| 3,417,497 | 12/1968 | Hannon | 283/7 |

FOREIGN PATENTS

| | | | |
|---|---|---|---|
| 717,387 | 10/1954 | Great Britain | 161/199 |

Primary Examiner—John T. Goolkasian
Assistant Examiner—D. J. Fritsch
Attorney—Seidel, Gonda & Goldhammer ABSTRACT: One or both of the front and rear windshields of a vehicle are constructed so as to carry the vehicle serial number. Theft of vehicles will be substantially reduced due to the vehicle's serial number being embedded between the layers of safety glass and thereby inaccessible.

PATENTED DEC 21 1971  3,629,044

INVENTOR
ALBERT J. SANGER
BY
Seidel, Gonda & Goldhammer
ATTORNEYS.

VEHICLE WINDSHIELD CARRYING VEHICLE SERIAL NUMBER

This invention relates to a theft protector for vehicles. Vehicle manufacturers identify their new automobiles and trucks by placing a metal plate or tag with a serial number on the vehicle. The metal plate or tag is usually found on the doorframe. Some new vehicles have the serial number imprinted or stamped on top of the padded dashboard. Other manufacturers locate the plate or tag containing the serial number wherein it is recessed on top of the dashboard.

After stealing a vehicle, thieves immediately pry off and/or change the serial number plate or tag. In the case of the tags or plates imbedded in the dashboard, they are removed and/or another superimposed thereabove.

The serial number of the vehicle is important since this number shows on the vehicle registration card that every driver must have when operating the vehicle. The serial number must be changed in order for vehicle thieves to sell the vehicle. A more detailed analysis of the manner in which stolen vehicles are processed by thieves and the enormous problem that it presents is set forth in an article appearing in *Reader's Digest*, Dec. 1969.

In accordance with the present invention, the vehicle serial number is mounted in the front windshield and preferably in both the front and rear windshields. In this manner, the serial number will be readily visible from outside the vehicle. The front and rear windshields are made of laminated safety glass which comprises a central reinforcement layer of plastic interposed between and bonded to plates of glass. The plastic material is generally methylmethacylate but may be any one of a wide variety of commercially available plastic materials.

The serial number may be applied to the central plastic layer by any convenient means such as etching. Alternatively, a thin small insert layer containing the serial number and made from a transparent material may be interposed between one of the layers of glass and the plastic material for carrying the serial number. In this manner, it will be noted that the serial number will be provided so that it cannot be scraped or pried off by the thief. In order to change the serial number of the vehicle, the thief will have to replace the front and rear windshield with glass from another stolen vehicle the same size and model. However, this will gain him nothing since also those serial numbers will be on a stolen vehicle list.

In the event of an accident, the windshield may be broken or damaged. The chances of both the front and rear windshields being damaged in the same accident is unlikely unless the accident is so severe so as to result in the vehicle being a total wreck. The equipment and raw materials necessary for counterfeiting serial numbers in the manner which they are presently utilized on vehicles is readily available. If vehicles are identified by serial numbers in accordance with the present invention, a substantially greater control is available due to the fact that there are a very limited number of sources for front and rear windshields. This is probably due to the large and expensive type of equipment needed in order to manufacture windshields. In the event that a windshield is replaced due to an accident, the registration papers will then carry dual serial numbers for that particular vehicle.

It is an object of the present invention to provide a novel means for eliminating and/or reducing the possibility of traffic in stolen vehicles by means of a novel manner in which the vehicle serial number is applied thereto.

It is another object of the present invention to provide vehicle serial numbers in the windshield of the vehicle.

It is another object of the present invention to provide a subcombination comprising a vehicle windshield of safety glass with the serial number of the vehicle in the windshield visible when viewing the windshield.

Other objects will appear hereinafter.

For the purpose of illustrating the invention, there is shown in the drawings a form which is presently preferred; it being understood, however, that this invention is not limited to the precise arrangements and instrumentalities shown.

Figure 1:
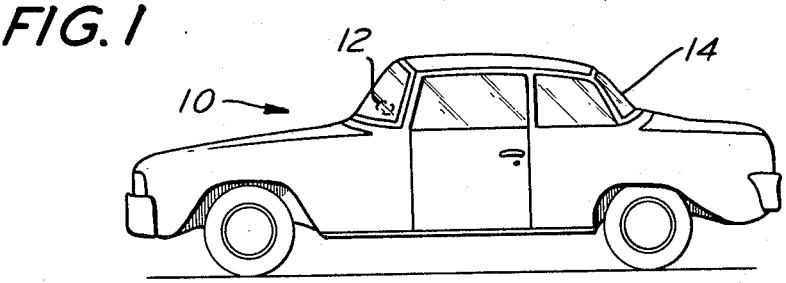
FIG. 1 is a side elevation view of a typical vehicle to which the present invention may be applied.

Referring to the drawing in detail, wherein like numerals indicate like elements, there is shown in FIG. 1 a vehicle designated generally as 10. While the vehicle 10 is an automobile, it may equally be a truck, bus, or the like. The vehicle 10 is provided with a front windshield 12 and a rear windshield 14.

Figure 2:
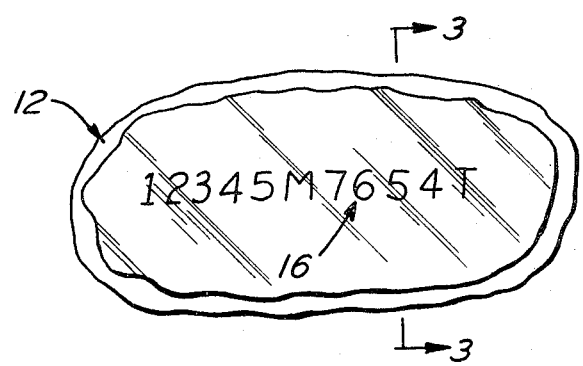
FIG. 2 is an enlarged detail view of the front windshield embraced by the dotted circle in FIG. 1.

In FIG. 2, there is shown an enlargement of a portion of the front windshield 12 adjacent one lower corner thereof. The serial number of the vehicle 10 is applied to the windshield 12 and designated generally by the numeral 16. Although not illustrated, the same serial number will be applied to the rear windshield 14 in the same manner.

Figure 3:
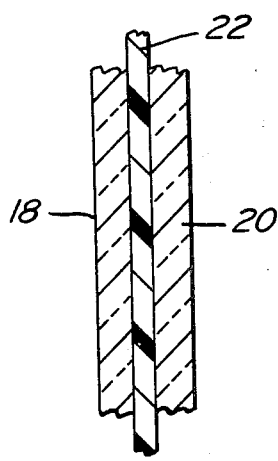
FIG. 3 is a sectional view taken along the line 3—3 in FIG. 2.

As shown more clearly in FIG. 3, the windshields are to be of the safety glass type involving a first layer of glass 18, and a second layer of glass 20 having a layer of plastic material 22 embedded therebetween and bonded thereto. The layer 22 may be any one of a wide variety of commercially available transparent plastic materials such as methylmethacylate. The serial number 16 is preferably applied to the layer 22 by printing thereon but may be applied in any convenient manner such as by etching, etc. Thus, when the serial number 16 is applied to the layer 22, it will ultimately determine the serial number of the entire vehicle. Since the serial number 16 will be embedded between the layers of glass 18 and 20, it will not be readily accessible to a thief of the vehicle.

Figure 4:
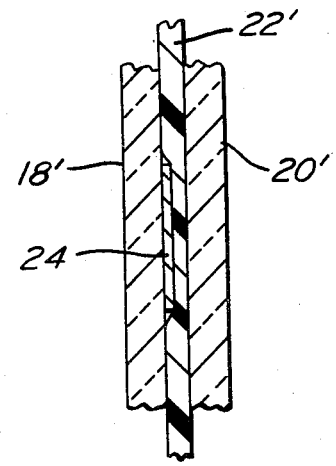
FIG. 4 is a sectional view of another embodiment, comparable to the view shown in FIG. 3, but illustrating another manner in which the serial number may be applied to the windshield.

In FIG. 4, there is illustrated another embodiment of the present invention identical with that described above except as will be made clear hereinafter. Hence, corresponding primed numerals are provided for corresponding elements. In FIG. 4, the serial number of the vehicle is applied to a small layer of transparent material 24 in any convenient manner such as that described above. The layer 24 may be of the same material as layer 22'.

The size of layer 24 may be varied as desired, but is preferably of a size of approximately 1 by 2 in. with a thickness of approximately three to four one-thousandths of an inch. Hence, it will be appreciated that the cross section illustrations in FIGS. 3 and 4 are not to scale. During fabrication, the layer 24 will be bonded directly to the layer 18'. Before inserting layer 22' between the layers 18' and 20', the layer 24 may be heat-sealed or adhesively joined to the layer 22'. Layers 18' and 22' will be bonded to each other in the same manner as described above except for the small area of the layer 24.

The present invention may be embodied in other specific forms without departing from the spirit or essential attributes thereof and, accordingly, reference should be made to the appended claims, rather than to the foregoing specification as indicating the scope of the invention.

I claim:

1. A windshield of safety glass for a vehicle comprising a layer of transparent plastic material sandwiched between and bonded to layers of glass, a vehicle serial number applied to said layer of plastic material, said serial number being visible through each of the layers of glass and inaccessible without breaking the layers of glass.

2. A windshield in accordance with claim 1 wherein said serial number is applied to the layer of plastic material by etching.

3. A windshield in accordance with claim 1 wherein a serial number is applied to said layer of plastic material by printing.

4. A windshield in accordance with claim 1 wherein said serial number is applied to said layer of plastic material by means of separate layer of transparent material disposed between one of said layers of glass and said layer of plastic material.

5. A windshield in accordance with claim 1 wherein said serial number is applied to the windshield adjacent a corner thereof.

6. A motor vehicle mounted on wheels and having a windshield of safety glass, said windshield including a layer of transparent plastic material sandwiched between and bonded to first and second layers of glass, the serial number of the vehicle being applied to said layer of plastic material so as to be visible through the glass layers, but inaccessible without breaking the glass layers.

7. A vehicle in accordance with claim 6 wherein said vehicle has a rear windshield, the same serial number of said vehicle being applied to said rear windshield in the same manner so as to be visible and inaccessible.

8. A vehicle in accordance with claim 6 wherein said serial number is applied to the windshield by etching the serial number on said layer of plastic material.

9. A vehicle in accordance with claim 6 wherein said serial number is applied to said windshield by printing the same on said layer of plastic material.

10. A vehicle in accordance with claim 6 wherein said serial number is applied to said windshield by means of a separate layer of transparent material disposed between one of said layers of glass and said layer of plastic material.

* * * * *